US008842119B2

(12) United States Patent
Hubbard

(10) Patent No.: US 8,842,119 B2
(45) Date of Patent: Sep. 23, 2014

(54) DISPLAYING SYSTEM PERFORMANCE INFORMATION

(75) Inventor: Eric Hubbard, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 192 days.

(21) Appl. No.: 12/948,538

(22) Filed: Nov. 17, 2010

(65) Prior Publication Data

US 2012/0120078 A1 May 17, 2012

(51) Int. Cl.
G06T 11/20 (2006.01)
G09G 5/22 (2006.01)
G06F 7/00 (2006.01)
G06F 17/30 (2006.01)

(52) U.S. Cl.
CPC .................. *G06T 11/206* (2013.01)
USPC ......... 345/440; 345/440.2; 707/798; 707/805

(58) Field of Classification Search
CPC ..... G06T 11/20; G06T 11/206; G06F 3/0481; G06F 3/04847; G06F 17/246; G06F 17/30958; G06F 17/30961; G06F 17/30286; G06F 17/30595; G06F 17/30067; G06F 17/30011; G06F 17/30554; H04L 41/22; G06Q 10/10; G06Q 10/06; G06Q 30/02
USPC ................ 345/440, 440.2; 707/798, 802, 805
See application file for complete search history.

(56) References Cited

U.S. PATENT DOCUMENTS

| | | | |
|---|---|---|---|
| 5,483,468 A | 1/1996 | Chen et al. | |
| 5,623,598 A * | 4/1997 | Voigt et al. | 714/47.2 |
| 5,682,489 A | 10/1997 | Harrow et al. | |
| 5,847,972 A | 12/1998 | Eick et al. | |
| 6,704,012 B1 | 3/2004 | Lefave | |
| 6,901,582 B1 | 5/2005 | Harrison | |
| 6,995,768 B2 * | 2/2006 | Jou et al. | 345/440 |
| 7,188,156 B2 * | 3/2007 | Bertram et al. | 709/219 |
| 7,437,359 B2 | 10/2008 | Aguilar-Macias et al. | |
| 7,559,053 B2 | 7/2009 | Krassovsky et al. | |
| 2002/0049687 A1 * | 4/2002 | Helsper et al. | 706/45 |
| 2005/0240620 A1 * | 10/2005 | Danner et al. | 707/102 |
| 2006/0036942 A1 * | 2/2006 | Carter | 715/526 |

(Continued)

OTHER PUBLICATIONS

Lam et al., "Session Viewer: Visual Exploratory Analysis of Web Session Logs," Visual Analytics Science and Technology, 2007. VAST 2007. IEEE Symposium on , vol., no., pp. 147-154, Oct. 30, 2007-Nov. 1, 2007.*

(Continued)

*Primary Examiner* — Aaron M Richer
*Assistant Examiner* — Sae Won Yoon

(57) ABSTRACT

Methods, apparatus, and articles of manufacture to display system performance information are disclosed. An example method involves normalizing data representative of an operation performed by a system, a first performance metric of the system, and an event that occurred during the operation and during measurement of the first performance metric. A first object indicative of a duration of the operation is displayed. A second object is displayed with the first object. The second object is indicative of the first performance metric during the performance of the operation. An event marker is displayed with the first and second objects. The event marker is indicative of the event. The event is representative of an instance in which the first performance metric exceeded a first threshold or fell below a second threshold. The first and second objects and the event marker are aligned along a same timeline in a same graph.

14 Claims, 7 Drawing Sheets

(56) References Cited

U.S. PATENT DOCUMENTS

| | | | |
|---|---|---|---|
| 2007/0136296 A1* | 6/2007 | Molesky | 707/10 |
| 2008/0114875 A1* | 5/2008 | Anastas et al. | 709/224 |
| 2008/0228100 A1* | 9/2008 | Navakatikyan | 600/544 |
| 2008/0288306 A1* | 11/2008 | MacIntyre et al. | 705/7 |
| 2009/0070455 A1 | 3/2009 | Cervantes | |
| 2009/0132607 A1 | 5/2009 | Danesi et al. | |
| 2010/0115443 A1 | 5/2010 | Richstein | |
| 2010/0161574 A1* | 6/2010 | Davidson et al. | 707/705 |

OTHER PUBLICATIONS

Manage Engine: Powering IT ahead, "SQLDB Manager Plus" retrieved from http://www.manageengine.com/products/applications_manager/sql/features.html on Aug. 19, 2010, 3 pages.

Bosch Jr., Robert P., "Using Visualization to Understand the Behavior of Computer Systems," A Dissertation submitted to the Department of Computer Science and the Committee on Graduate Studies of Stanford University, Aug. 2001, 100 pages.

Koike et al., "Snort View: Visualization System of Snort Logs," VizSEC/DMSEC '04, Washington, DC, USA, Oct. 29, 2004, pp. 143-147.

Lam et al., "Session Viewer: Visual Exploratory Analysis of Web Session Logs," IEEE Symposium on Visual Analytics Science and Technology, Oct. 30-Nov. 1, 2007, pp. 147-154.

Manage Engine: Powering IT ahead, "Manage Engine ® SQLDB Manager Plus" Product Overview Powerpoint, retrieved from http://manageengine.com/products/applications_manager/sql/reseller_docs/SQLDManagerPlus_Overview.ppt, 11 pages.

Aharon et al., "One Graph is worth a Thousand Logs: Uncovering Hidden Structures in Massive System Event Logs," HP-Labs Israel, Technion City, Haifa, Israel, ECML PKDD 2009, Sep. 7, 2009, 15 pages.

HP GlacePlus Software, "Data Sheet," retrieved from https://h10078.wwwl.hp.com/hpdc/navigation.do? action=downloadPDF&caid=4446&cp=54_4000_100&zn=bto&filename=4AA1-1027ENW.pdf, Apr. 2007, 4 pages.

PCT; Notification of Transmittal of the International Search Report and the Written Opinion of the International Searching Authority, or the Declaration; PCT/US2010/058589; dates Nov. 4, 2011; 8 pages.

* cited by examiner

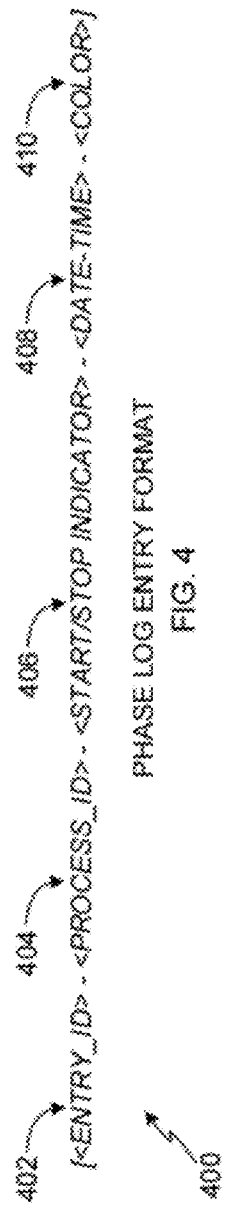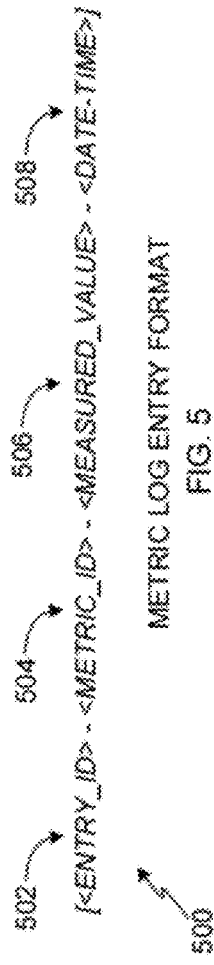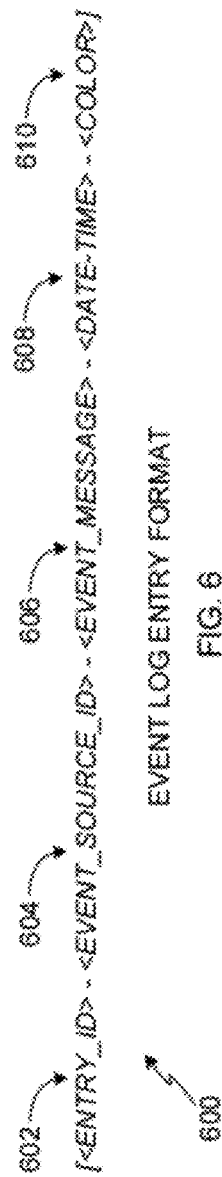
PHASE LOG ENTRY FORMAT
FIG. 4
METRIC LOG ENTRY FORMAT
FIG. 5
EVENT LOG ENTRY FORMAT
FIG. 6

DISPLAYING SYSTEM PERFORMANCE INFORMATION

BACKGROUND

Computer and network performance analysis systems generate log data to represent performance information and other process information associated with one or more systems. Such log data may be used to analyze performance of a single computer, a small network, or large enterprise networks spanning a campus or over several geographic regions. In some instances, information technology (IT) management solutions collect large amounts of data across hundreds and thousands of servers and applications in complex IT environments. The collected data can be stored for subsequent retrieval and analysis by IT personnel.

BRIEF DESCRIPTION OF THE DRAWINGS

FIG. 4 is an example phase log entry format that may be used to format log entries representative of start and stop times of one or more processes or operations.

FIG. 5 is an example metric log entry format that may be used to format log entries storing measured, acquired, or otherwise collected values associated with monitored process(es), operation(s), and/or system(s).

FIG. 6 is an example event log entry format that may be used to format log entries storing event-related information.

DETAILED DESCRIPTION

Figure 1A:
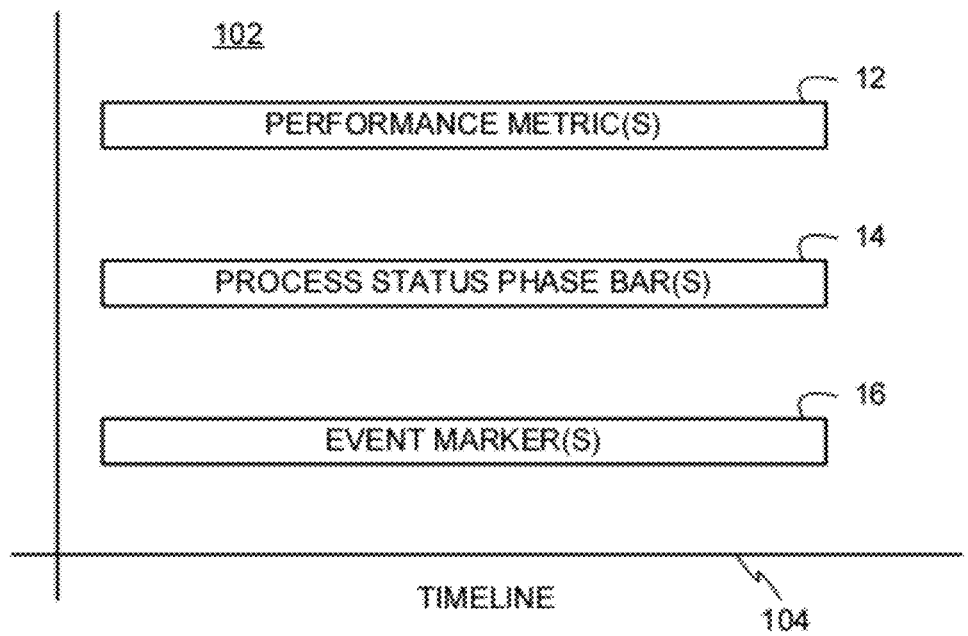
FIG. 1A is an example graph displaying system performance information in accordance with example methods, apparatus, and articles of manufacture disclosed herein.

Traditional performance visualization systems are designed to operate with a particular type of logging format such that rendered visual performance representations are representative of a single type of information such as performance metrics on a single graph, event markers on a single graph, or process statuses on a single graph. Each application log file is in a different format and contains information that is product specific. As a result, traditional performance visualization applications often require specifically trained people that understand the contents of the log files to render visual representations of those log files. In larger suites of applications and/or software solutions, log files from multiple products are often involved in any particular issue. Consequently, a problem is that it can require several people to troubleshoot just one performance issue by, for instance, correlating points of interest between different visual renderings or graphical outputs corresponding to different log files (e.g., data from different log files rendered in separate graphs).

Unlike traditional performance visualization systems, example methods, apparatus, systems, and articles of manufacture disclosed herein generate visual representations of different types of information from multiple log files in a time-synchronized relationship on a same graph. Further, the information is rendered automatically without the need of specifically trained persons interpreting log files. Moreover, because the visual representations are displayed on a same graph, example methods, apparatus, systems, and articles of manufacture disclosed herein enable users to intuitively see time-based relationships between event(s), process(es), and metric(s) without requiring several people to correlate portions of interest between different graphical outputs corresponding to different information.

Example methods disclosed herein display a bar indicative of a phase (e.g., an operation or process performed by a system and having a particular duration). In some example implementations, bars are color-coded to indicate different statuses of corresponding phases. Some such example methods also display a line plot adjacent the bar. The line plot is indicative of a performance metric of the system during the performance of the operation or process (i.e., during the phase represented by the bar). In addition, some such example methods involve displaying an event marker adjacent the line plot and the bar. The event marker is indicative of an event that occurred during the performance of the operation or process (i.e., during the phase represented by the bar) and during measurement of the performance metric. The event is representative of an instance in which the performance metric or another performance metric exceeded a first threshold or fell below the same or a different, second, threshold. Some such example methods display the bar, the line plot, and the event marker in a time-based alignment along the same timeline in the same graph.

An example graph area 102 displaying system performance information in accordance with example methods, apparatus, and articles of manufacture disclosed herein is shown in FIG. 1A. The example graph area 102 displays performance metric(s) information 12, one or more process status phase bar(s) 14, and one or more event marker(s) 16 adjacent one another. In the illustrated example, the logged data from which the performance metric(s) information 12, the process status phase bar(s) 14, and the event marker(s) 16 are derived is normalized in the time domain so that the performance metric(s) information 12, the process status phase bar(s) 14, and the event marker(s) 16 are aligned along a same timeline 104 on the graph area 102. In this manner, a person can relatively easily perceive time-based relationships between the displayed information.

Example apparatus disclosed herein include a user control interface to receive selections of phase information, performance metrics, and/or event information to display along the same timeline in the same graph. Some such example apparatus include a display interface to display first and second bars, first and second line plots, and/or first and second event markers in a time-based alignment along the same timeline in the same graph. In some such example apparatus, the first bar is indicative of a phase representative of a first duration of an operation performed by a system, and the second bar is indicative of a sub-phase of the phase and representative of a second duration of a sub-operation of the operation. In some such examples, the first line plot is indicative of a first performance metric of the system during the performance of the operation, and the second line plot is indicative of a second performance metric of the system during the performance of the operation. In some such examples, the first event marker is indicative of a first event that occurred during the performance of the operation and during measurement of the first performance metric, and the second event marker is indicative of a second event that occurred during the performance of the operation and during measurement of the first performance metric. The first event is representative of an instance in which the first performance metric, the second performance metric, and/or a third performance metric exceeded a first threshold or fell below a second threshold.

Figure 1B:
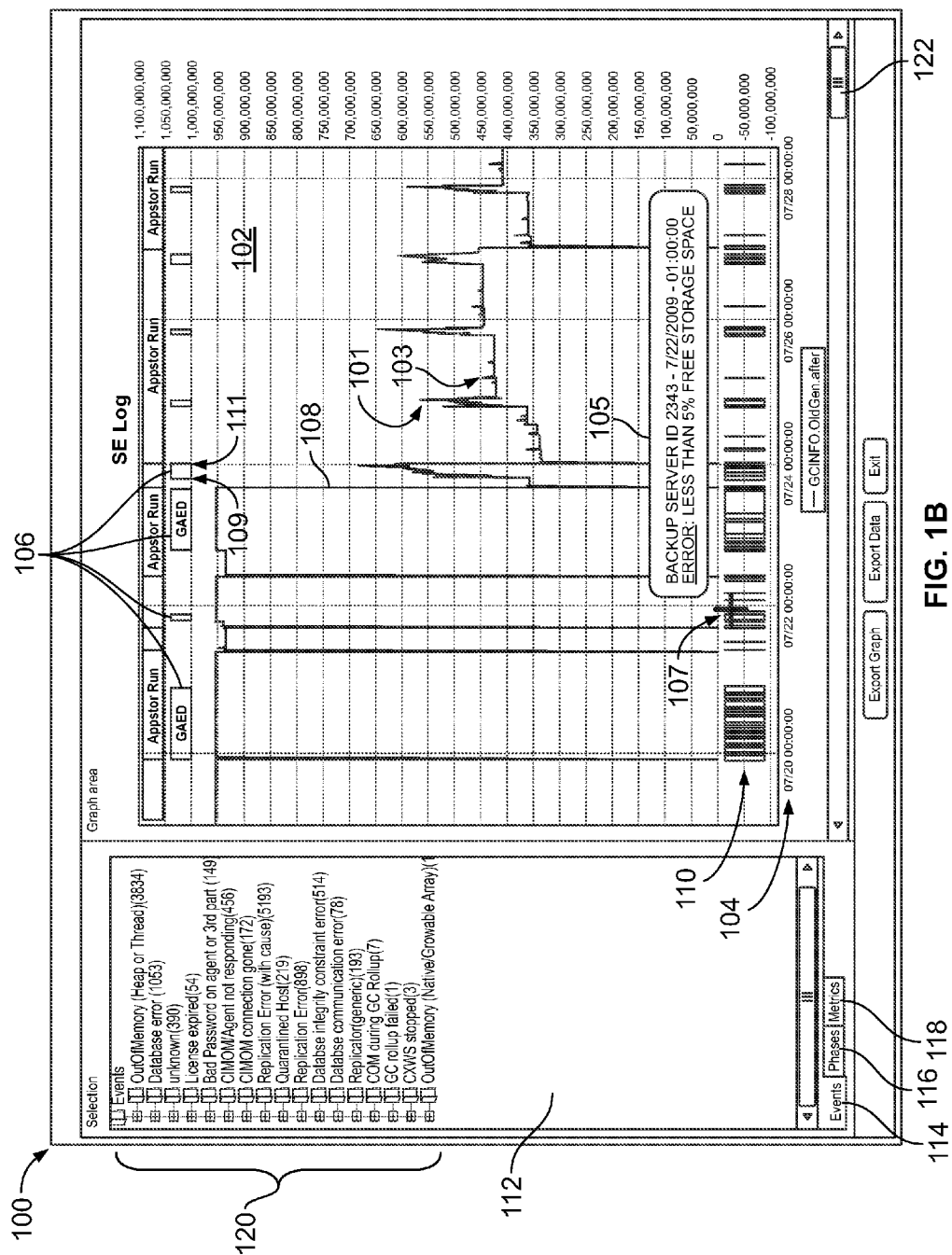
FIG. 1B depicts an example graphical user interface (GUI) that may be used to display phase(s), metric(s), and/or event(s) for one or more monitored processes, operations, and/or systems in a single graph area in a time-synchronized manner relative to the same timeline.

Turning to FIG. 1B, an example graphical user interface (GUI) 100 is shown with the graph area 102 having the timeline 104. The GUI 100 may be used to display visual representations of one or more phases, one or more metrics, and/or one or more events adjacent one another in the graph area 102 in a time-synchronized manner relative to the timeline 104. In the illustrated example of FIG. 1B, to generate such visual representations, information from different log files is normalized by time-scaling and amplitude-scaling phase, metric, and/or event information for simultaneous display on a single graph (e.g., the graph area 102) along the same timeline (e.g., the timeline 104) such that events, phases, and/or metrics are visually correlated in a time-synchronized manner to enable a person to easily perceive correlations and see relationships between the different information.

In the illustrated example of FIG. 1B, the GUI 100 renders phase bars 106, a metric line plot 108, and event markers 110 in the same graph area 102. As used herein, a phase is an operation or process that has a start time and an end time. A phase may be represented by one or more phase bars 106. A start time of a phase may be logged as a start time log entry. An end time may be logged as an end time log entry in a log file. For example, a backup operation has a duration demarked by a start time A and an end time B. Phases may also have status information associated therewith. For example, the backup operation could have failed for some reason, or it could have succeeded. In the illustrated example of FIG. 1B, the phase bars 106 are shown on the graph area 102 as horizontal bars. Each of the phase bars 106 starts at a starting point in time and ends at an ending point in time, both of which are aligned with the timeline 104 based on when its respective operation or process started and ended. To show status information (e.g., failure, success, warning, informative, etc.), each phase bar 106 is color-coded by the type of status information to be depicted for its respective phase. For example, a failure status may show as red, a success status may show as green, a warning status may show as yellow, and an informative status may show as blue. Any other colors and/or mappings of colors to states may be employed.

As used herein, a metric is composed of one or more numeric values measured, acquired or collected at regular or irregular intervals in time. The collected values may be represented by graphical objects that have amplitudes that convey meaningful information about the metric. For example, free storage space on a network storage device might be 45% at 11:00 PM, July 24$^{th}$ (shown at reference numeral 101 in FIG. 1B) and 65% at 2:00 AM, July 25$^{th}$ (shown at reference numeral 103 in FIG. 1B). In the illustrated example of FIG. 1B, the 45% and 65% free space measurements 101 and 103 are shown by metric line plot 108 having respective amplitudes (for 45% and 65%) at 11:00 PM and 2:00 AM aligned with the timeline 104.

As used herein, an event is an occurrence at a specific point in time. An event is typically represented by a log entry in a log file and may be shown graphically in FIG. 1B by an event marker 110. An event may represent an instance in which a performance metric exceeded a first threshold or fell below a second threshold (which may be the same or different from the first threshold), either of which condition triggered the generation of the log entry representative of the event. For example, an error message (e.g., an error message shown at descriptive tooltip text 105 of FIG. 1B) that occurred at 1:00 AM could generate an event. An event could be, for example, a critical error message. In other examples, an event need not be critical or of an urgent nature, but it may instead be something informative or that a user can completely ignore (e.g., an informational warning). In the illustrated examples described herein, events are indicated by the event markers 110, which are visually represented in the graph area 102 using vertical lines or tick marks aligned with the timeline 104 at their respective points of occurrence. In the illustrated example of FIG. 1B, the event markers 110 are color coded by severity. For example, a failure status may show as red, a success status may show as green, a warning status may show as yellow, and an informative status may show as blue. Any other colors and/or mappings of colors to states may be employed. In addition, the GUI 100 may be configured to display the descriptive tooltip text 105 next to an event marker when a user interface cursor 107 (e.g., a mouse cursor) is moved or hovered over the event marker to indicate further details about the corresponding event.

As can be seen from FIG. 1B, aligning the phase bars 106, the metric line plot 108, and the event markers 110 in a time-synchronous manner along the timeline 104 enables users to see correlations (e.g., cause and effect correlations or other contemporaneous correlations) between processes, metrics, and/or events displayed on the graph area 102. For example, if one of the phase bars 106 is color-coded yellow to indicate a warning, without more, a user would not be able to know at which point in time the warning was triggered or what caused the warning. However, using the GUI 100, the user could quickly peer at the timeline 104, metric line plot 108, and/or the event markers 110 appearing at the same or approximately the same time as the yellow color-coded phase bar 106 to determine when the warning occurred (e.g., based on an event marker 110 indicating a warning event) and why the warning occurred (e.g., based on an amplitude value on the metric line plot 108).

In an example implementation in which the phase bars 106, the metric line plot 108, and the event markers 110 are associated with a backup process, a user may refer to a phase bar 106 to observe that a backup process was in progress at 10:10 PM on July 23$^{rd}$ (indicated by reference numeral 109 in FIG. 1B) and ended at 12:00 AM on July 24$^{th}$ (indicated by reference numeral 111 in FIG. 1B). The user might also see that during that time, 5% of free space on a target backup server was used up based on the metric line plot 108. In addition, the user could scroll back through time with reference to the timeline 104 to see phase bars (e.g., phase bars similar to the phase bars 106) corresponding to previous backup processes and determine based on the metric line plot 108 if 5% of the target backup storage had also been used during those backup processes. For example, the user can select and drag a scroll bar 122 or click and drag the graph area 102 to scroll forwards or backwards in time with reference to the timeline 104. In addition, if the backup process failed, the user could refer to the event markers 110 at or around the same time to determine whether a critical event was logged to indicate a particular error message in a log file. The user could also scroll back to see if the error message was logged during previous successful backup processes.

In the illustrated example of FIG. 1B, the phase bars 106 are associated with the same type of process (labeled as process GAED) that is performed multiple times. Each of these processes has respective start and end times during the duration spanning the length of the timeline 104. In addition, the metric line plot 108 corresponds to the same type of metric and the event markers 110 correspond to events tracked for the same monitored process, operation, and/or system. However, as described below in connection with FIG. 2, multiple phase bars may be displayed in the same graph area to represent different types of processes, multiple metric line plots may be displayed in the same graph area to represent different types of metrics, and event markers corresponding to different monitored processes, operations, and/or systems may be displayed in the same graph area. In the illustrated example of FIG. 1B, the phase bars 106, the metric line plot 108, and the event markers 110 are displayed using alpha blending techniques so that they are relatively easily visible even at portions in which they overlap one another. For example, alpha blending may be used to combine a foreground color (e.g., a translucent foreground color) with a background color, which may, in some instances, produce a new, blended color.

Although process status is shown in FIG. 1B as the horizontal phase bars 106, in other example implementations, other types of graphical objects may be used to represent process status such as horizontal lines or other shapes and/or patterns. Although the metric line plot 108 is used to represent a performance metric, performance metrics may alternatively or additionally be graphically represented using other types of graphical objects such as discrete plot points having any suitable shape. In addition, the event markers 110 may be indicated graphically using any suitable type of graphical object other than vertical tick marks.

To enable user selections (or de-selections) of different phase, metric, and/or event information for display in the graph area 102, the GUI 100 is provided with a data selection area 112 having an events tab 114, a phases tab 116, and a metrics tab 118. In the illustrated example of FIG. 1B, the events tab 114 is active and shows an example events source tree 120 providing access to different log sources of event information. Similarly, the phases tab 116 of the illustrated example, when selected, shows a phase tree providing access to different phase sources, and the metrics tab 118 of the illustrated example, when selected, shows a metrics tree providing access to different metrics sources. In some example implementations, the GUI 100 is configured to auto-arrange in the graph area 102 any data selected from the data selection area 112. In other example implementations, the GUI 100 may be configured to allow users to select a log source and drag it from the data selection area 112 to a particular part of the graph area 102 at which the user desires to see the log data displayed. In the illustrated example of FIG. 1B, to remove phase, metric, and/or event information from the graph area 102, a user may de-select the phase, metric, or event in the data selection area 112.

In the illustrated example, the graph area 102 enables users to zoom in to particular time frames. For example, a user can select a time frame to zoom into based on times noted on the timeline 104 or a user may select to zoom in to a time frame spanning the duration of a particular one of the phase bars 106 by, for example, double-clicking on the desired phase bar 106.

Figure 2:
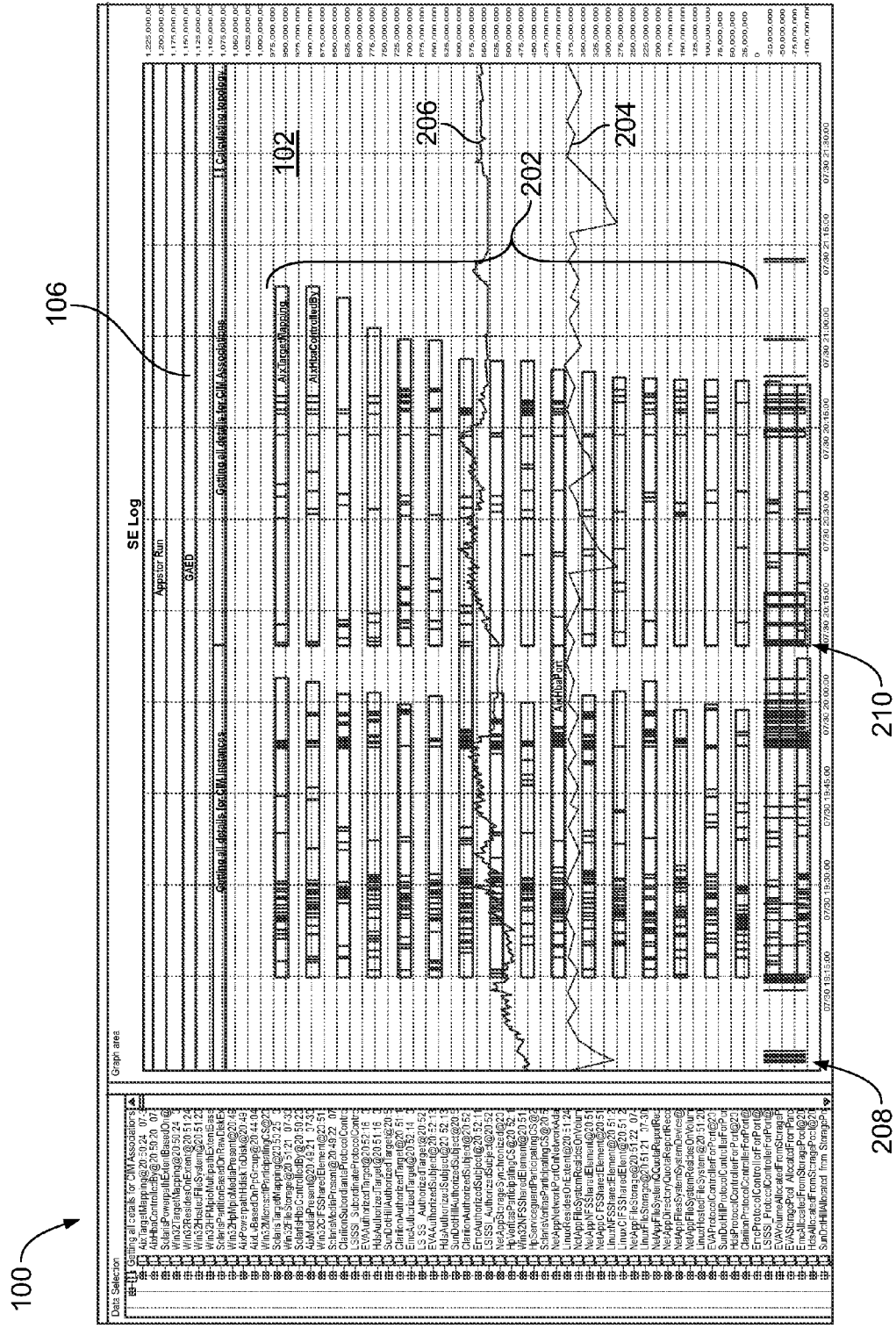
FIG. 2 depicts the example GUI of FIG. 1B showing visual representations on the same graph area of multiple types of phases, multiple types of metrics, and events corresponding to different monitored processes, operations, or systems.

Turning to FIG. 2, the example GUI 100 shows visual representations on the same graph area 102 of multiple types of phases, multiple types of metrics, and events corresponding to different monitored processes, operations, and/or systems. In the illustrated example of FIG. 2, the phase bar 106 labeled as GAED is associated with multiple sub-phases that are visually represented on the graph area 102 as sub-phase bars 202. Each sub-phase bar 202 corresponds to a sub-phase or sub-operation that is performed during the performance of a process or operation corresponding to the phase bar 106. In the illustrated example, each of the sub-phase bars 202 appearing on a separate vertical alignment corresponds to a different process or operation. For example, one sub-phase may be a data transfer operation, while another sub-phase may be a virus scan operation.

In some example implementations, to display the sub-phase bars 202, a user may select corresponding sub-phase data sources from the data selection area 112. In other example implementations, a user may double-click on the phase bar 106, and the GUI 100 may be configured to respond to the double-click event by automatically retrieving log information for all of the sub-phases associated with the phase bar 106 and displaying the sub-phase bars 202 as shown in FIG. 2.

As also shown in FIG. 2, the graph area 102 displays two metric line plots 204 and 206, each of which corresponds to a different type of metric. For example, the metric line plot 204 may correspond to an amount of free space remaining on a network server, while the metric line plot 206 may correspond to a data throughput at the network server.

In addition, the graph area 102 shows event markers 208 and 210, each of which corresponds to a different monitored process, operation, and/or system. For example, the event marker 208 may correspond to free space available on a server such that the event marker 208 may be generated (and color coded) to indicate that the free space fell below a free-space threshold. The event marker 210 may correspond to available throughput at the server such that the event marker 210 may be generated (and color coded) to indicate that the server was congested and fell below a particular data throughput threshold.

Figure 3:
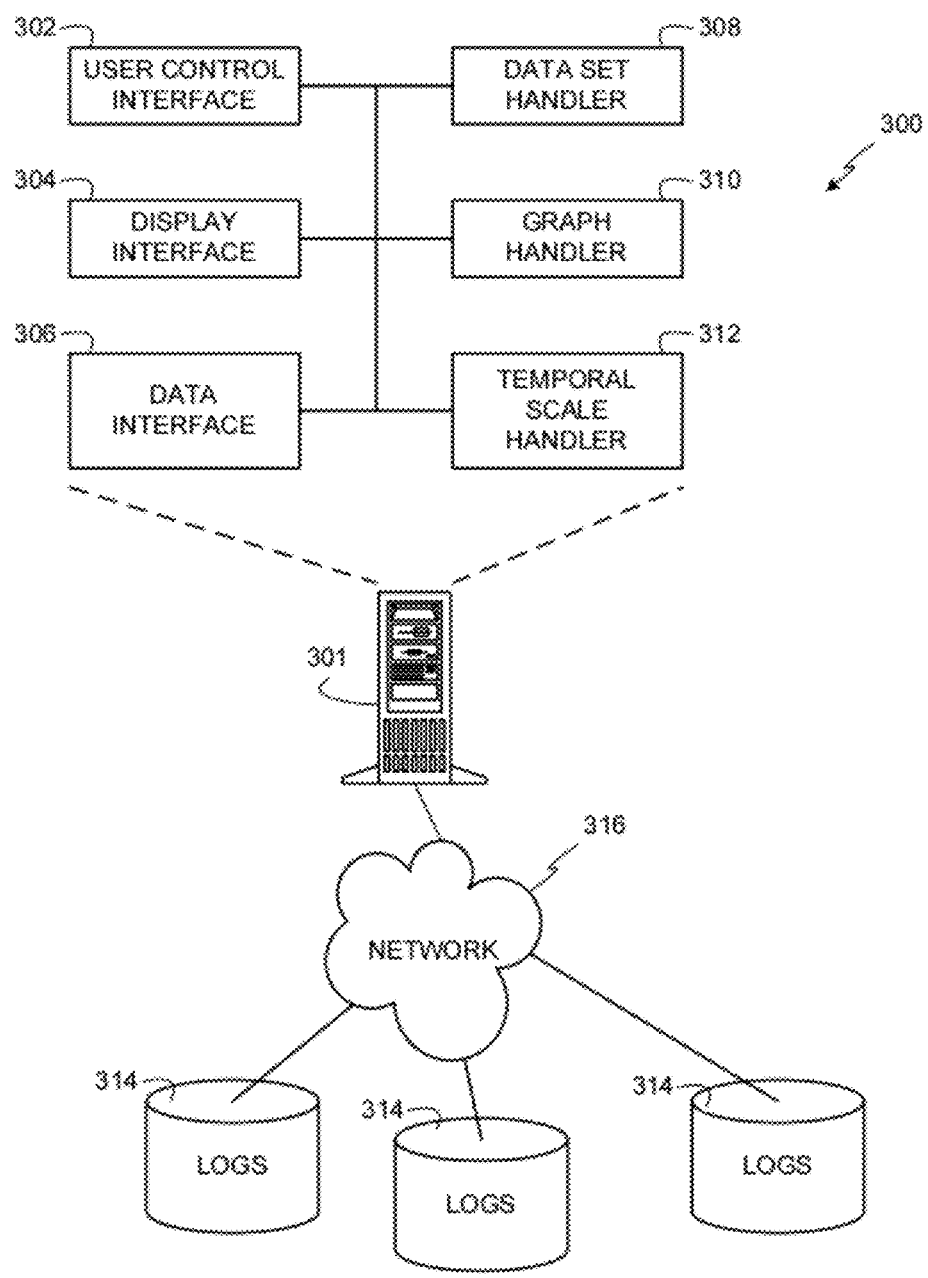
FIG. 3 depicts an example apparatus that may be used to retrieve phase, metric, and/or event information for one or more monitored processes, operations, and/or systems and display visual representations of the phase(s), metric(s), and/or event(s) in a single graph area in a time-synchronized manner relative to the same timeline.

FIG. 3 depicts an apparatus 300 that may be used to retrieve phase, metric, and/or event information and display phases, metrics, and/or events in a same graph area (e.g., the graph area 102 of FIGS. 1A, 1B, and 2) in a time-synchronized manner relative to the same timeline (e.g., the timeline 104 of FIGS. 1A and 1B) as discussed above in connection with FIGS. 1A, 1B, and 2. In the illustrated example of FIG. 3, the example apparatus 300 is implemented in a server 301 but may alternatively or additionally be implemented in any other suitable processor system or computer. In some example implementations, the example apparatus 900 may be used to implement a portion or all of one or more JAVA® applications or applets that implement the GUI 100 of FIGS. 1B and 2. Another programming language and/or script may alternatively be used. In the illustrated example, the apparatus 300 is provided with an example user control interface 302, an example display interface 304, an example data interface 306, an example data set handler 308, an example graph handler 310, and an example temporal scale handler 312. While an example manner of implementing the apparatus 300 has been illustrated in FIG. 3, one or more of the elements, processes and/or devices illustrated in FIG. 3 may be combined, divided, re-arranged, omitted, eliminated and/or implemented in any other way. Further, the user control interface 302, the display interface 304, the data interface 306, the data set handler 308, the graph handler 310, and the temporal scale handler 312 and/or, more generally, the example apparatus 300 of FIG. 3 may be implemented by hardware, software, firmware and/or any combination of hardware, software and/or firmware. Thus, for example, any of the user control interface 302, the display interface 304, the data interface 306, the data set handler 308, the graph handler 310, and the temporal scale handler 312 and/or, more generally, the example apparatus 300 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the user control interface 302, the display interface 304, the data interface 306, the data set handler 308, the graph handler 310, and/or the temporal scale handler 312 are hereby expressly defined to include a computer readable medium such as a memory, DVD, CD, etc. storing the software and/or firmware. Further still, the example apparatus 300 of FIG. 3 may include one or more elements, processes and/or devices in addition to, or instead of, those illustrated in FIG. 3, and/or may include more than one of any or all of the illustrated elements, processes and devices.

Turning in detail to FIG. 3, the apparatus 300 is provided with the user control interface 302 to receive user control input from the GUI 100. Such user control input may include user selections, user-interface dragging events, data additions or removals to/from the graph area 102, selections in the graph area 102, time-scale magnification (zoom in) or demagnification (zoom out) requests, etc.

The apparatus 300 is provided with the display interface 304 to display the GUI 100 on any type of display driver (e.g., a liquid crystal display (LCD) monitor, a light emitting display (LED) monitor, a cathode ray tube (CRT) monitor, etc.).

The apparatus 300 is provided with the data interface 306 to request and receive data (e.g., data source identifiers, phase data, performance metrics data, events data, etc.) from log data sources 314 via a network 316 or from data stored locally in the server 301.

The apparatus 300 is provided with the data set handler 308 to process phase log entries, metric data sets, and/or event log entries for display on the GUI 100 as described above in connection with FIGS. 1B and 2. For example, the data set handler 308 manages amplitude-scale and time-scale normalization and/or formatting of phase log entries, metric data sets, and/or event log entries to display such information in a time-synchronized manner along the same timeline (e.g., the timeline 104 of FIGS. 1A and 1B).

The apparatus 300 is provided with the graph handler 310 to generate graph views (e.g., the view of the graph area 102 of FIGS. 1A, 1B, and 2), render graphical representations of phase log entries, metric data sets, and event log entries (e.g., as shown in FIGS. 1A, 1B, and 2), and combine graphical representations of different log data in graph views in a time-synchronized manner relative to the same timeline (e.g., the timeline 104 of FIGS. 1A and 1B). In the illustrated example, the graph handler 310 also color-codes objects (e.g., phase bars, line plots, event markers, etc.) on the graph area 102.

The apparatus 300 is provided with the temporal scale handler 312 to manage time-scale adjustments for magnification views. For example, upon receipt of a user selection (e.g., a double-click event) of one of the phase bars 106 of FIG. 1B, the temporal scale handler 312 can determine the time span corresponding to the selected phase bar 106 and generate a magnified view of the information displayed in the graph area 102 spanning between the start and end of the selected phase bar 106. The temporal scale handler 312 can operate in a similar manner in connection with selections based on time ranges on the timeline 104 (FIGS. 1A and 1B).

In the illustrated example of FIG. 3, the log data stored in the logs 314 is formatted in a manner corresponding to whether the logs 314 store phase information, metric information, or event information. For example, FIGS. 4-6 respectively show example formats of phase log entries, metric log entries, and event log entries. As shown in FIG. 4, an example phase log entry format 400 includes an entry ID field 402, a process ID field 404, a start/stop indicator field 406, a date-time stamp field 408, and a color indicator field 410. In the illustrated example, the entry ID field 402 stores a unique ID for the log entry within a particular log file. The process ID field 404 of the example of FIG. 4 identifies a particular instance or occurrence of a corresponding operation or process. In the illustrated example, the start/stop indicator field 406 is used to indicate whether the log entry corresponds to the start or the end of a process or operation. The date-time stamp field 408 of the illustrated example is used to indicate the date and time at which a corresponding process or operation started or stopped. The color indicator field 410 of FIG. 4 indicates a color coding to apply to a phase bar (e.g., one of the phase bars 106 or 202 of FIGS. 1B and 2) when displayed in a graph area (e.g., the graph area 102 of FIGS. 1A, 1B, and 2). To display one of the phase bars 106, the data interface 306 retrieves a start log entry and a stop log entry, each having the same ID in the process ID field 404. In this manner, the data interface 306 of the illustrated example uses the process ID field 404 and the start/stop indicator field 406 to determine the starting and ending points of the phase bar 106.

As shown in FIG. 5, an example metric log entry 500 includes an entry ID field 502, a metric ID field 504, a measured value field 506, and a date-time stamp field 508. In the illustrated example, the entry ID field 502 is a unique ID for the log entry within a particular log file. The metric ID field 504 of FIG. 5 identifies a particular measure or collection of data points acquired to form the same metric line plot (e.g., the metric line plot 108 of FIG. 1B). The measured value field 506 of the illustrated example stores a value acquired at a particular point in time based on a process, operation, or system to be monitored using a metric line plot. The date-time stamp field 508 of FIG. 5 indicates the date and time at which a value of the measured value field 506 was collected or acquired. To display the metric line plot 108 of FIG. 1B, the data interface 306 retrieves all of the metric log entries having the same ID in the metric ID field 504 and spanning over a duration indicated by the timeline 104 of FIGS. 1A and 1B. In this manner, the data interface 306 of the illustrated example uses the measured values in the measured value field 506 and the date and time information in the date-time stamp field 508 to generate the visual depiction of the metric line plot 108.

As shown in FIG. 6, an example event log entry format 600 includes an entry ID field 602, an event source ID field 604, an event message field 606, a date-time stamp field 608, and a color indicator field 610. In the illustrated example, the entry ID field 602 is a unique ID for the log entry within a particular log file. The event source ID field 604 of the illustrated example identifies a particular process, operation, and/or system that caused the logging of an event. The event message field 606 of FIG. 6 stores a message generated for the event represented by the event log entry. For example, the event message field 606 may include a reason indicating why the event log was generated. The date-time stamp field 508 of the illustrated example indicates the date and time at which a corresponding event was generated. The color indicator field 610 of FIG. 6 indicates a color coding to apply to an event marker (e.g., one of the event markers 110 of FIG. 1B) when displayed in a graph area (e.g., the graph area 102 of FIGS. 1A, 1B, and 2).

Figure 7:
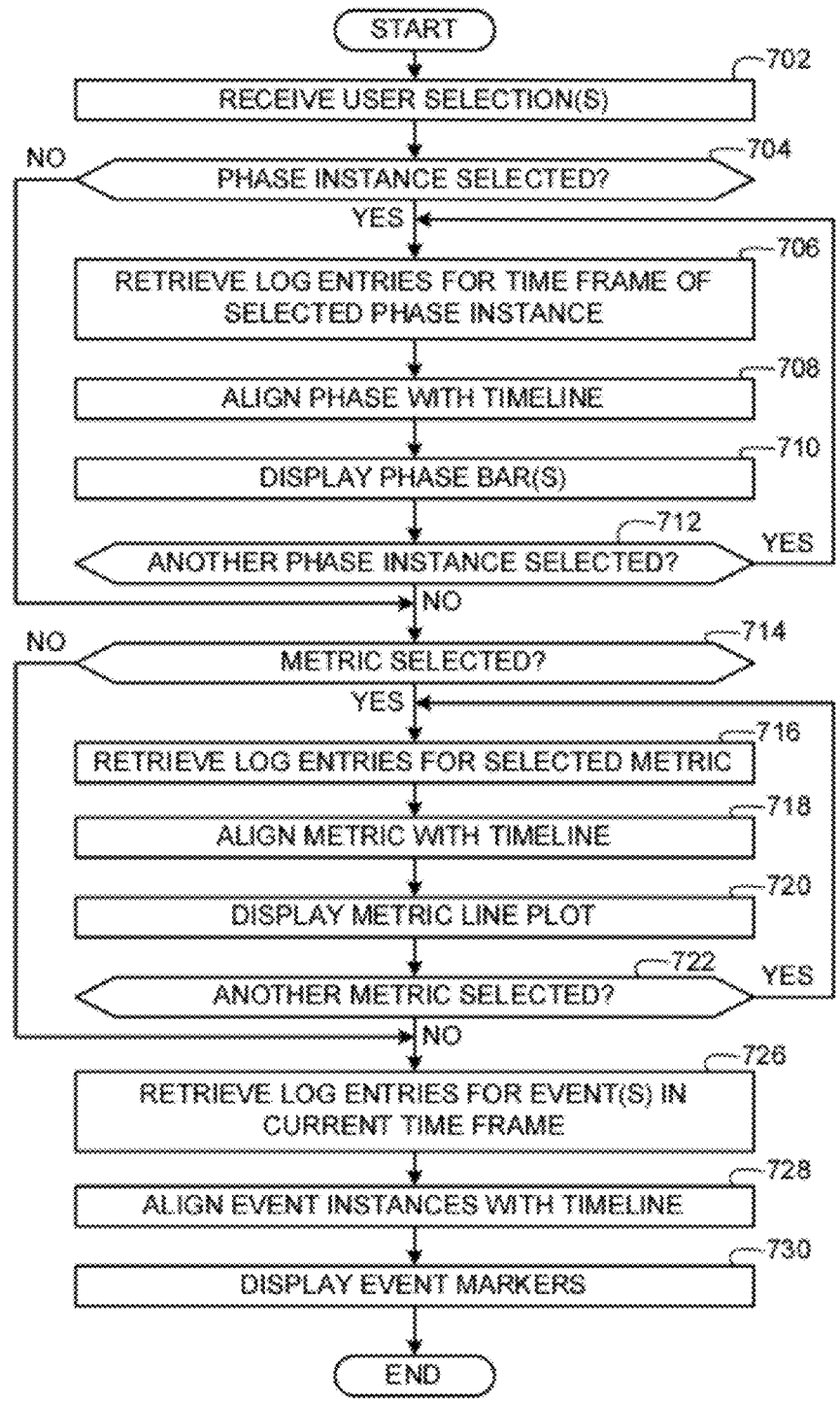
FIG. 7 is a flow diagram representative of example machine readable instructions to implement the example apparatus of FIG. 3 to retrieve phase, metric, and/or event information and display visual representations of phase(s), metric(s), and/or event(s) in a single graph area in a time-synchronized manner relative to the same timeline.

FIG. 7 depicts a flow diagram representative of example machine readable instructions for implementing the example apparatus 300 of FIG. 3. In this example, the machine readable instructions comprise a program for execution by a processor such as the processor 812 shown in the example computer 810 discussed below in connection with FIG. 8. The program may be embodied in software stored on a computer readable medium such as a CD-ROM, a floppy disk, a hard drive, a digital versatile disk (DVD), or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 7, many other methods of implementing the example apparatus 300 may alternatively be used. For example, the order of execution of the blocks may be changed, and/or some of the blocks described may be changed, eliminated, or combined.

As mentioned above, the example process of FIG. 7 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example process of FIG. 7 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Now turning in detail to FIG. 7, initially, the user control interface 302 receives one or more user selections (block 702). For example, the user selections may be selections of log sources in the data selection area 112 of FIG. 1B. The example apparatus 300 determines whether an instance of a phase was selected (block 704). For example, a user selection at block 702 may be of a phase log in the phases tab 116 of FIG. 1B. If the apparatus 300 determines at block 704 that a phase instance was selected, the data interface 306 retrieves log entries for a time frame of the selected phase instance (block 706). For example, the data interface 306 may retrieve pairs of start and stop log entries logged during the time frame of the selected phase instance. The data set handler 308 aligns the phase instance with the timeline 104 (FIGS. 1A and 1B) (block 708). The graph handler 310 then displays a phase bar (e.g., one of the phase bars 106 of FIG. 1B) corresponding to the selected phase instance (block 710). For example, the graph handler 310 may send the visual representations of the phase bar 106 to the display interface 304 for graphical rendering on a physical display apparatus. The apparatus 300 determines whether another phase instance was selected by a user (block 712). For example, the user may select a phase instance and a sub-phase instance corresponding to different monitored processes and/or operations as described above in connection with FIG. 2. If the apparatus 300 determines at block 712 that another phase instance (e.g., a sub-phase) was selected, control returns to block 706.

If the apparatus 300 determines that another phase instance was not selected (block 712) or if the apparatus 300 determines at block 704 that a phase instance was not selected at all, control advances to block 714. The example apparatus 300 determines whether a metric was selected (block 714). For example, a user selection at block 702 may be of a metric log in the metrics tab 118 of FIG. 1B. If the apparatus 300 determines at block 714 that a metric was selected, the data interface 306 retrieves log entries for the selected metric (block 716). For example, the data interface 306 may retrieve all of the log entries having the same metric ID (e.g., in the metric ID field 504 of FIG. 5) that were logged within a time range indicated by the timeline 104 of FIGS. 1A and 1B. The data set handler 308 aligns the metric data with the timeline 104 (block 718). The graph handler 310 then displays a metric line plot (e.g., the metric line plot 108 of FIG. 1B) corresponding to the selected metric (block 720). For example, the graph handler 310 may send the visual representation of the metric line plot 108 to the display interface 304 for graphical rendering on a physical display apparatus. The apparatus 300 determines whether another metric was selected by a user (block 722). For example, the user may use the data selection area 112 to select multiple metrics corresponding to different monitored processes, operations, and/or systems. If the apparatus 300 determines at block 722 that another metric was selected, control returns to block 716.

If the apparatus 300 determines that another metric was not selected (block 722) or if the apparatus 300 determines at block 714 that a metric was not selected at all, control advances to block 726. The data interface 306 retrieves one or more log entries corresponding to one or more events that occurred in the current time frame displayed in the graph area 102 (FIGS. 1A, 1B, and 2) (block 726). For example, the data interface 306 may retrieve all of the log entries that were logged within a time range indicated by the timeline 104 of FIGS. 1A and 1B. The data set handler 308 aligns the event instances with the timeline 104 (block 728). The graph handler 310 then displays one or more event markers (e.g., the event markers 110 of FIG. 1B) corresponding to the one or more events (block 730). For example, the graph handler 310 may send the visual representation(s) of the one or more event markers 110 to the display interface 304 for graphical rendering on a physical display apparatus. The process of FIG. 7 then ends.

Figure 8:
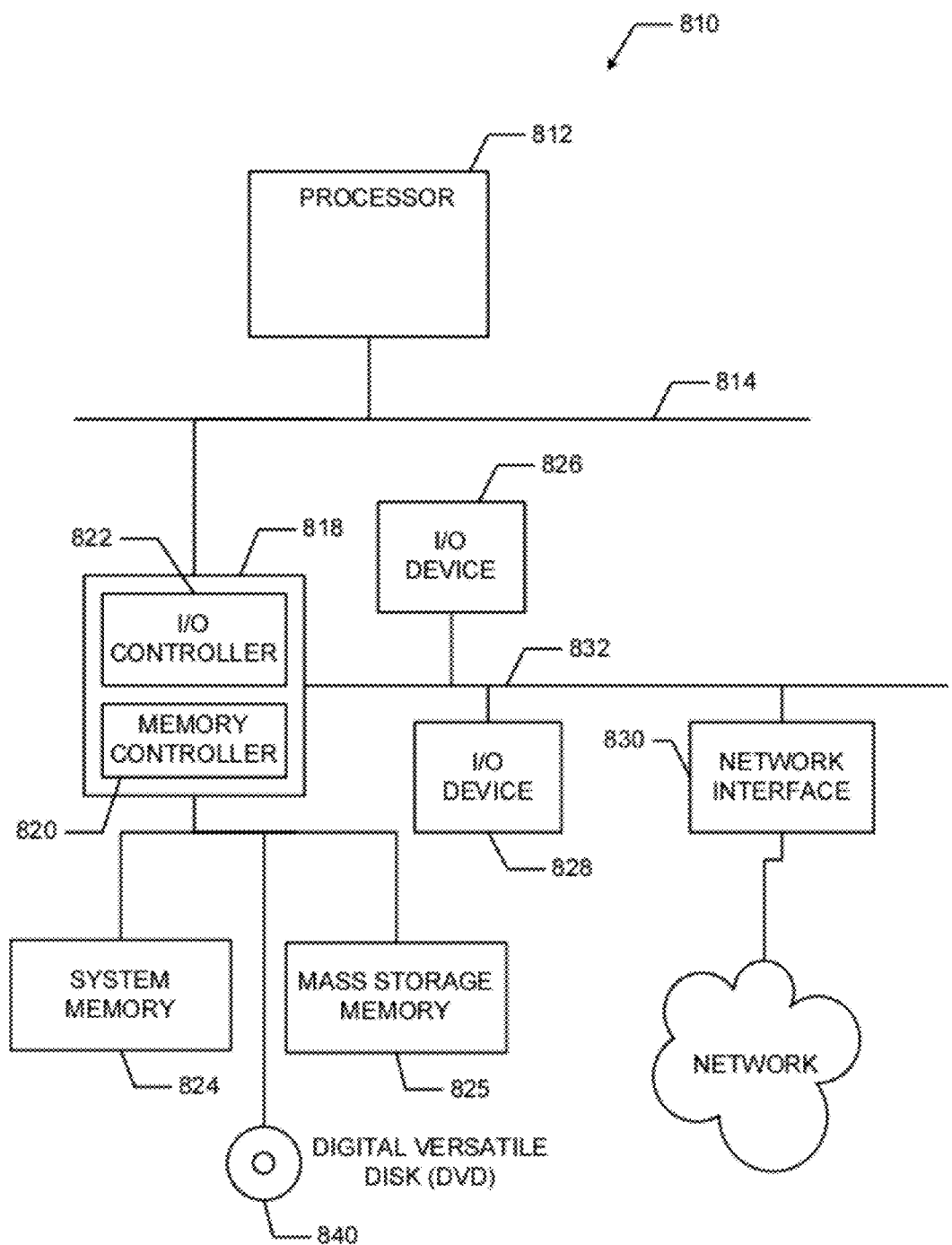
FIG. 8 is an example processor system that can be used to execute the example instructions of FIG. 7 to implement the example apparatus of FIG. 3.

FIG. 8 is a block diagram of an example processor system 810 that may be used to execute the machine readable instructions of FIG. 7 to implement the example methods, apparatus, and articles of manufacture described herein. For example, a processor system substantially similar or identical to the example processor system 810 may be used to implement the apparatus 300 of FIG. 3, example user control interface 302, the example display interface 304, the example data interface 306, the example data set handler 308, the example graph handler 310, the example temporal scale handler 312, the GUI 100 (FIGS. 1B and 2) and/or example techniques and features associated therewith as described above in connection with FIGS. 1-7.

As shown in FIG. 8, the processor system 810 includes a processor 812 that is coupled to an interconnection bus 814. The processor 812 may be any suitable processor, processing unit, or microprocessor. Although not shown in FIG. 8, the system 810 may be a multi-processor system and, thus, may include one or more additional processors that are identical or similar to the processor 812 and that are communicatively coupled to the interconnection bus 814.

The processor 812 of FIG. 8 is coupled to a chipset 818, which includes a memory controller 820 and an input/output (I/O) controller 822. A chipset provides I/O and memory management functions as well as a plurality of general purpose and/or special purpose registers, timers, etc. that are accessible or used by one or more processors coupled to the chipset 818. The memory controller 820 performs functions that enable the processor 812 (or processors if there are multiple processors) to access a system memory 824, a mass storage memory 825, and/or a digital versatile disk (DVD) 840.

In general, the system memory 824 may include any desired type of volatile and/or non-volatile memory such as, for example, static random access memory (SRAM), dynamic random access memory (DRAM), flash memory, read-only memory (ROM), etc. The mass storage memory 825 may include any desired type of mass storage device including hard disk drives, optical drives, tape storage devices, etc. The machine readable instructions of FIG. 7 may be stored in the system memory 824, the mass storage memory 825, and/or the DVD 840.

The I/O controller 822 performs functions that enable the processor 812 to communicate with peripheral input/output (I/O) devices 826 and 828 and a network interface 830 via an I/O bus 832. The I/O devices 826 and 828 may be any desired type of I/O device such as, for example, a keyboard, a video display or monitor, a mouse, etc. The network interface 830 may be, for example, an Ethernet device, an asynchronous transfer mode (ATM) device, an 802.11 device, a digital subscriber line (DSL) modem, a cable modem, a cellular modem, etc. that enables the processor system 810 to communicate with another processor system.

While the memory controller 820 and the I/O controller 822 are depicted in FIG. 8 as separate functional blocks within the chipset 818, the functions performed by these blocks may be integrated within a single semiconductor circuit or may be implemented using two or more separate integrated circuits.

Although the above discloses example methods, apparatus, and articles of manufacture including, among other components, software executed on hardware, it should be noted that such methods, apparatus, and articles of manufacture are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the above describes example methods, apparatus, and articles of manufacture, the examples provided are not the only way to implement such methods, apparatus, and articles of manufacture. Thus, although certain methods, apparatus, and articles of manufacture have been described herein, the scope of coverage of this patent is not limited thereto. To the contrary, this patent covers all methods, apparatus, and articles of manufacture fairly falling within the scope of the claims either literally or under the doctrine of equivalents.

What is claimed is:

1. A method to display system performance information, the method comprising:
normalizing phase information from a first log file having a first time scale, the phase information representative of a first duration of an operation and a second duration of a sub-operation performed by a system, first and second performance metrics of the system from a second log file having a second time scale, and event information representative of events that occurred during the performance of the operation and during measurement of the first and second performance metrics, the event information from a third log file having a third time scale, wherein normalizing the phase information, the first and second performance metrics, and the event information comprises changing the first time scale of the phase information, the second time scale of the first and second performance metrics, and the third time scale of the event information to be on a same time scale;
displaying a first bar indicative of the first duration of the operation, the first bar being based on the phase information, and the first bar color-coded to indicate a status of the operation;
displaying first and second line plots with the first bar, the first and second line plots indicative of corresponding ones of the first and second performance metrics during the performance of the operation;
displaying first and second event markers with the first bar and the first and second line plots, the first and second event markers based on the event information, the first and second event markers representative of events that occurred during the performance of the operation and during measurement of the first performance metric in which the first performance metric exceeded a first threshold or fell below a second threshold, the first bar, the first and second line plots, the first and second event markers aligned along a same timeline based on the same time scale in a same graph, and a portion of the first bar overlapping a portion of the first line plot; and
displaying a second bar along the same timeline based on the same time scale in the same graph with the first bar, the first and second line plots, and the first and second event marks in response to receiving a user-selection of the first bar, the second bar indicative of the second duration of the sub-operation of the operation based on the phase information, the sub-operation being one of a plurality of different types of sub-operations performed during different phases of the operation, the sub-operations including at least one of a virus scan or a data backup operation.

2. A method as defined in claim 1, further comprising displaying a data selection area having one of events data sources, metrics data sources, or phase data sources, the events data sources to facilitate user selection of a third event marker to display along the same timeline in the same graph, the metrics data sources to facilitate user selection of a third performance metric to display along the same timeline in the same graph, and the phase data sources to facilitate user selection of a phase to display as a third object along the same timeline in the same graph.

3. A method as defined in claim 2, wherein the first event marker, the second event marker, and the third event marker correspond to different types of events.

4. A method as defined in claim 1, wherein the first and second event markers are a vertical tick mark aligned along the same timeline.

5. A method as defined in claim 1, wherein the normalizing comprises reading first log entries in a first format to determine the first duration of the operation, reading second log entries in a second format to derive the first performance metric, and reading a third log entry in a third format to derive the first event marker.

6. A method as defined in claim 5, wherein the first format includes a process start indicator field, wherein the second format includes a measured value field, and wherein the third format includes an event message field.

7. A method as defined in claim 1, wherein the normalizing further comprises changing an amplitude scale of at least one of the data, the first performance metric, or the event.

8. An apparatus to display system performance information, the apparatus comprising: system and a second bar in response to receiving a user-selection of the first bar, the
- a user control interface to receive selections of phase information from a first log file having a first time scale, performance metrics from a second log file having a second time scale, and event information from a third log file having a third time scale, the user control interface to normalize the first time scale, the second time scale, and the third time scale to display the phase information, the performance metrics, and the event information along a same timeline based on a same time scale in a same graph; and
- a display interface to display the phase information, the performance metrics, and the event information along the same graph by:
  - displaying a first bar indicative of a first duration of an operation performed by a first bar color-coded to indicate a status of the operation, the second bar indicative of a second duration of a sub-operation of the operation, the first and second bars based on the phase information, the sub-operation being one of a plurality of different types of sub-operations performed during different phases of the operation, the sub-operations including at least one of a virus scan or a data backup operation;
  - displaying first and second line plots based on the performance metrics, the first line plot indicative of a first performance metric of the system during the performance of the operation, and the second line plot indicative of a second performance metric of the system during the performance of the operation; and
  - displaying the first and second event markers based on the event information, the first event marker indicative of a first event that occurred during the performance of the operation and during measurement of the first performance metric, the second event marker indicative of a second event that occurred during the performance of the operation and during measurement of the first performance metric, the first event representative of an instance in which the first performance metric or the second performance metric exceeded a first threshold or fell below a second threshold, the first bar, the second bar, the first line plot, the second line plot and the first and second event markers aligned along the same timeline based on the same time scale in in the same graph, and a portion of at least one of the first bar or the second bar overlapping a portion of at least one of the first line plot or the second line plot.

9. An apparatus as defined in claim 8, further comprising a graph handler to color-code the first bar to indicate the status of the operation.

10. An apparatus as defined in claim 8, further comprising a graph handler to color-code the first and second event markers differently from one another to indicate at least one of an error, a warning, or an information status about respective ones of the first and second events.

11. An apparatus as defined in claim 8, further comprising a temporal scale handler to adjust a resolution of the timeline in response to zoom in and zoom out requests to view different levels of detail associated with the first and second bars, the first and second line plots, and the first and second event markers.

12. An apparatus as defined in claim 8, wherein the first and second event markers are vertical tick marks aligned along the same timeline.

13. A tangible machine readable medium storing instructions that, when executed, cause a machine to at least:
- display a first bar indicative of a first duration of an operation performed by a system, the first bar is based on first information in a first log file having a first time scale, the first bar color-coded to indicate a status of the operation;
- display a first line plot and a second line plot with the first bar, the first line plot
- indicative of a first performance metric of the system during the performance of the operation, the second line plot indicative of a second performance metric of the system during the performance of the operation, the first and second line plots being based on second information in a second log file having a second time scale;
- display first and second event markers with the first and second line plots and the first bar, the first and second event markers being from a third log file having a third time scale, the first event marker indicative of a first event that occurred during the performance of the operation and during measurement of the first performance metric, the second event marker indicative of a second event that occurred during the performance of the operation and during measurement of the first performance metric, the first event representative of an instance in which the first performance metric exceeded a first threshold or fell below a second threshold;
- normalize the first information, the second information, and the first and second event markers to change the first time scale of the first information, the second time scale of the second information, and the third time scale of the first and second event markers to be on a same time scale, the first bar, the first and second line plots, and the first and second event marks aligned along a same timeline based on the same time scale in a same graph, and a portion of the first bar overlapping a portion of the first line plot; and
- display a second bar along the same timeline based on a same time scale in the same graph with the first bar, the first and second line plots, and the first and second event markers in response to receiving a user-selection of the first bar, the second bar being indicative of a second duration of a sub-operation of the operation, the sub-operation being one of a plurality of different types of sub-operations performed during different phases of the operation, the sub-operations including at least one of a virus scan or a data backup operation.

14. A tangible machine readable medium as defined in claim 13 having instructions stored thereon that, when executed, cause the machine to at least display a third bar along the same timeline in the same graph corresponding to a second sub-phase of the operation.

* * * * *

UNITED STATES PATENT AND TRADEMARK OFFICE
CERTIFICATE OF CORRECTION

PATENT NO.         : 8,842,119 B2
APPLICATION NO.    : 12/948538
DATED              : September 23, 2014
INVENTOR(S)        : Eric Hubbard Page 1 of 1

It is certified that error appears in the above-identified patent and that said Letters Patent is hereby corrected as shown below:

In the Claims

In column 12, line 3, in Claim 1, delete "haying" and insert -- having --, therefor.

In column 13, lines 9-10, in Claim 8, after "comprising:" delete "system and a second bar in response to receiving a user-selection of the first bar, the".

In column 13, line 25, in Claim 8, after "performed by a" insert -- system and a second bar in response to receiving a user-selection of the first bar, the --.

In column 13, line 52, in Claim 8, delete "in in" and insert -- in --, therefor.

Signed and Sealed this
Eighth Day of September, 2015

Michelle K. Lee
*Director of the United States Patent and Trademark Office*